(12) United States Patent
Krammer et al.

(10) Patent No.: US 8,170,826 B2
(45) Date of Patent: May 1, 2012

(54) CALIBRATION METHOD FOR A POSITION DETERMINATION OF A REAR AXLE STEERING ACTUATOR

(75) Inventors: Gert Krammer, Graz (AT); Michael Erhart, Graz (AT); Jochen Lackner, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 438 days.

(21) Appl. No.: 12/493,292

(22) Filed: Jun. 29, 2009

(65) Prior Publication Data
US 2010/0010766 A1  Jan. 14, 2010

(30) Foreign Application Priority Data
Jul. 8, 2008  (DE) ..................... 10 2008 032 046 U

(51) Int. Cl.
G01P 21/00 (2006.01)
G01C 17/38 (2006.01)
G01L 25/00 (2006.01)
(52) U.S. Cl. .............. 702/94; 702/84; 702/92; 702/105; 702/150; 702/151
(58) Field of Classification Search .................... 702/94, 702/85, 92, 105, 150, 151
See application file for complete search history.

(56) References Cited

U.S. PATENT DOCUMENTS
6,032,109 A * 2/2000 Ritmiller, III ................. 702/104
2006/0042411 A1* 3/2006 Abele et al. ....................... 74/29

FOREIGN PATENT DOCUMENTS
DE        10326384 A1    12/2004
DE      102004042243 A1    9/2005
* cited by examiner

*Primary Examiner* — Janet Suglo
(74) *Attorney, Agent, or Firm* — Harness, Dickey & Pierce, P.L.C.

(57) ABSTRACT

The present invention relates to a method for the calibration of a position determination system of a rear axle steering actuator for a motor vehicle. The rear axle steering actuator has an actuator element which can be driven by a rotary movement of a rotor to a translation movement and whose geometrical center position is determined by a reference measurement. The position determination system includes a linear sensor and a rotary sensor. During calibration, a piece of calibration information is generated which includes a piece of zero point information of the linear sensor and a piece of sector information. The measurement range of the rotary sensor is divided into at least two sectors. The sector information identifies that angle at which the angular position of the rotor lies when the actuator element is arranged in its geometrical center position. The calibration information is stored in the linear sensor.

41 Claims, 3 Drawing Sheets

| Sector | Frequency | Range from: | Range to: | Center, nominal |
|---|---|---|---|---|
| 0 | 250HZ | 315° | 44° | 0° |
| 1 | 500HZ | 45° | 134° | 90° |
| 2 | 1000HZ | 135° | 224° | 180° |
| 3 | 2000HZ | 225° | 314° | 270° |

CALIBRATION METHOD FOR A POSITION DETERMINATION OF A REAR AXLE STEERING ACTUATOR

CROSS-REFERENCE TO RELATED APPLICATIONS

This application claims the benefit and priority of German Patent Application No. 10 2008 032 046.3 filed Jul. 8, 2008. The disclosure of the above application is incorporated herein in its entirety.

FIELD

The present invention relates to a method for the calibration of a position determination system of a rear axle steering actuator for a motor vehicle.

BACKGROUND

The statements in this section merely provide background information related to the present invention and may not necessarily constitute prior art.

In many actuators which are used in connection with a driving dynamics regulation of a motor vehicle, actuation movements have to be carried out precisely to achieve a respective desired effect advantageously influencing the handling of the vehicle. A very high absolute precision and resolution of the position sensor system is required with respect to the position regulation and position monitoring of an active rear axle steering, for example, to generate the suitable reaction of the rear axle steering in dependence of a steering wheel position.

Sensors which are able to determine the position of an element of the actuator sufficiently accurately over its total excursion range are frequently expensive. Optical sensors admittedly deliver the required accuracy; however, they become dirty easily and are therefore not sufficiently reliable.

A further aspect which has to be taken into account in the conception of a rear axle steering actuator relates to the calibration of the position determination system. Since every actuator and its sensors have individual tolerances, every actuator or its position determination system has to be calibrated. The determined calibration data must be provided to a control device associated with the actuator in a suitable manner, with a first installation or a replacement of the actuator being possible without interfering with the control device.

SUMMARY

It is therefore the object of the invention to provide a position determination system of a rear axle steering actuator which can be calibrated in a simple and reliable manner. In addition, a corresponding method for the calibration of the position determination system is provided.

As already initially mentioned, the method in accordance with the invention serves for the calibration of a position determination system of a rear axle steering actuator for a motor vehicle. The rear axle steering actuator has an actuator element which can be driven to a translation movement by a rotary movement of a rotor—for example the rotor of an electric motor which is a part of the rear axle steering actuator—and whose geometrical center position is determined by means of a reference measurement. The position determination system includes a linear sensor and a rotary sensor. During the calibration of the position determination system, a piece of calibration information is generated which includes a piece of zero point information of the linear sensor and a piece of sector information. The measurement range of the rotary sensor is divided into at least two sectors and the sector information identifies that sector in which the angular position of the rotor detected by the rotary sensor lies when the actuator element is arranged in its geometrical center position. The generated calibration information is stored in the linear sensor.

In other words, the position determination system to be calibrated uses two different sensors with different measurement ranges and measurement accuracies in order always to generate an accurate position signal of the actuator element. The linear sensor, for example, has a larger measurement range than the rotary sensor; however, it is less precise with respect to its spatial resolution. A cost-effective, but nevertheless sufficiently precise rotary sensor with respect to its angular resolution can possibly only make a determination as to which angular position the rotor driving the actuator element adopts. Such rotary sensors can frequently not deliver any information with respect to the absolute position of the actuator element. An accurate position determination of the actuator element can be carried out by the combination of the pieces of information of the two sensors. The requirement for this is, however, a precise calibration of the position determination system.

For this purpose, the geometrical center position of the actuator element is determined by means of a reference measurement. In addition, the calibration information already mentioned above is generated which includes at least two pieces of partial information. The zero point information of the linear sensor indicates which position information the linear sensor determines when the actuator element is located in the named geometrical center position. The sector information, in contrast, relates to the rotary sensor whose measurement range is divided into at least two sectors. Specifically, the measurement range of the rotary sensor corresponding to a mechanical revolution of the rotor is divided into a plurality of sectors which cover specific angular ranges. The sectors can generally have different sizes; however, a division into sectors of equal size is preferred.

If the actuator element is located in the geometrical center position, the rotary sensor delivers an angular value which can be associated with a specific sector. The sector information thus contains the information as to in which of the sectors the angular position of the rotor driving the actuator element lies when the actuator element is arranged in the geometrical center position. The advantage of the method inter alia comprises the fact that the pieces of partial information of the calibration information can be determined independently of one another.

The calibration information is stored in the linear sensor. The information applicable to the respective installed actuator is thus always available and an updating of calibration information stored in an external control device is not necessary.

In an exemplary installation process of the rear axle steering actuator in a motor vehicle, the actuator element is located in the center position, i.e. in a neutral position, which is in particular of importance on a traveling of the vehicle straight ahead. No further calibration activities are thereby necessary to make the system ready for operation, such as an actuator-specific configuration of a control device controlling the driving dynamics of the vehicle.

In accordance with an advantageous embodiment of the method In accordance with the invention, the respective angular range covered by the sectors is larger than the angular resolution of the rotary sensor. Since the number of the sensors is thus smaller than the number of the angular positions which can be resolved per se, the sector information to be stored is also smaller. The selection of the sector size can, for example, be matched to the required calibration precision.

Provision can be made that the linear sensor includes a non-volatile memory section in which at least one part of the calibration information is stored. In other words, only the zero point information can be stored, for example. In addition, the sector information can also be stored in the memory section. Such a memory section is anyway provided in the linear sensors to be considered for use so that no cost-driving separate components are required to store the calibration information.

The sector information can also be stored in the linear sensor in different manners. A respective preset frequency of an output signal of the linear sensor is preferably associated with the sectors. The sector information can be stored in the linear sensor by a selection of the corresponding frequency of the output signal. In other words, the sector information can be encoded in the output signal frequency by a corresponding configuration of the linear sensor. Based on this procedure, additional memory space for the storage of the sector information can be dispensed with.

As already mentioned above, the geometrical center position of the actuator element is determined by means of a reference measurement. The reference measurement can in each case include at least one measurement in at least two defined reference positions, with each measurement including at least one measured value determination of at least one sensor. A measurement can thus include a plurality of measured value determinations by a plurality of sensors.

The reference measurement preferably includes measurements by means of a third position sensor which is in particular based on an optical measurement process. Such measurement processes can be carried out particularly precisely and simply. The initially addressed problem of the easy contamination of optical sensors is only present in the operation of the rear axle steering actuator and not on its calibration, which in particular takes place ex works under controlled conditions. The position determination system is preferably calibrated by means of laser measurements.

In accordance with a particularly simple embodiment of the calibration process, the actuator element is moved into the geometrical center position in its course. Subsequently, the zero point information of the linear sensor and the sector information of the rotary sensors are determined there.

The geometrical center position can be determined by the formation of a geometrical average from measurements in two maximum excursions of the actuator element. The maximum excursions of the actuator element are in particular defined by a respective mechanical abutment. To ensure that a maximum excursion was actually reached, the position of the actuator elements in the respective maximum excursion can be checked by at least one repeat position determination and/or can be determined by averaging of at least two position determinations.

For example, the measured value determinations of the linear sensor and/or of the rotary sensor and/or of the third position sensor are utilized to determine the position of the actuator element in the respective maximum excursion a plurality of times one after the other. The position of the actuator element in the maximum excursion is in this case a value which was confirmed by one or more repeat measurements, i.e., when the repeat measurements coincide within the framework of a predetermined tolerance range. Alternatively, the position of the actuator element in the respective maximum excursion can be determined by an averaging of the data obtained.

This "abutment search" increases the accuracy of the calibration process and serves for the identification of stiffness situations which possibly result in a "sticking" of the actuator before the reaching of the actual abutment.

The reaching of the respective maximum excursion can be defined by falling below a predetermined threshold value of the speed of the actuator element.

In accordance with an advantageous embodiment of the method in accordance with the invention, the sector information is determined with reference to measured values of the rotary sensor determined in the maximum excursions and with reference to the number of revolutions of the rotor determined by means of the rotary sensor during the movement of the actuator element between the maximum excursions. In other words, that sector can be calculated in a simple manner in which the angular position of the rotor is disposed when the actuator element is arranged in its geometrical center position. For this purpose, the angular positions of the rotor in the maximum excursions and the number of the revolutions of the rotor during the movement from one maximum excursion to the other are required. This embodiment of the method thus makes possible the determination of the sector information without the geometrical center of the actuator element having to be moved to.

In accordance with a further embodiment of the method, a plurality of measurements of the linear sensor are carried out for the position determination in different measurement positions of the actuator element. In this respect, the precise location of the measurement position relative to the geometrical center of the actuator element is determined by measurements of the third position sensor. Based on the deviations of the position determination of the linear sensor from the precisely known measurement positions, at least one correction parameter and/or at least one correction function is/are determined which are taken into the zero point information of the linear sensor. The zero point information can, for example, be interpolated or extrapolated by this sampling point method using at least two measurements. By the comparison of the data at the sampling points, a check can also be made whether the linear sensor has non-linear measurement errors in the relevant measurement range. Optionally, corresponding correction parameters/functions are determined to compensate for these errors. They are taken into the zero point information of the linear sensor or are themselves stored therein. This embodiment of the method is thus a teach-in method with sampling points. This concept is generally independent of the center position calibration, but can be advantageously combined with it to improve the precision of the position determination system.

As initially mentioned, the present invention also relates to a corresponding position determination system of a rear axle steering actuator for a motor vehicle. The rear axle steering actuator has an actuator element which can be driven to a translation movement by a rotary movement of a rotor. The position determination system includes a rotary sensor and a linear sensor which are connected to the rear axle steering actuator. The position determination system is moreover connectable to a calibration unit for the calibration by which a geometrical center position of the actuator element between two maximum excursions can be determined. Furthermore, the measurement range of the rotary sensor—which, for example, corresponds to one revolution of the rotor—is divided into at least two sectors by the calibration unit. In addition, a piece of calibration information can be generated by it which includes the above-described zero point information and the sector information. The calibration information can also be stored in the linear sensor by the calibration unit.

In other words, the position determination system can be calibrated by a calibration unit, for example at the manufacturer's of the rear axle steering actuator. The calibration unit in this respect, on the one hand, takes over the determination of the geometrical center position of the actuator element; on the other hand, also the generation and storage of the calibration information.

A rear axle steering actuator having the above-described position determination system can be calibrated in a simple manner, with the corresponding information being stored in the actuator itself, namely in the linear sensor installed in it. Since no information has to be stored in the rotary sensor, additional memory means and their connection to further control devices are omitted there.

The respective angular range covered by the sectors can preferably be divided such that it is larger than the angular resolution of the rotary sensor.

Provision can further be made that the linear sensor includes a non-volatile memory section in which at least one part of the calibration information can be stored.

In accordance with a further embodiment of the position determination system, the linear sensor can be configured such that the sector information is encoded by a frequency of an output signal of the linear sensor associated with the identified sector. A part of the calibration information—the sector information—is thereby provided by a characteristic parameter of the output signal—its frequency. For example, the device controlling the rear axle steering actuator obtains the zero point information of the linear sensor in a conventional manner, whereas the sector information of the rotary sensor can be taken from the frequency of the signal. Two different pieces of information thus do not have to be read out of and transmitted from one or more memory sections, which considerably simplifies the information transmission.

Provision can be made that the calibration unit includes a position sensor which is in particular based on an optical measurement process, with the position of the actuator element relative to a reference point being able to be determined by means of the position sensor.

The calibration unit can additionally be made such that the above-described correction parameters/functions can be determined by means of sampling points.

The present invention further relates to a method for the operation of a rear axle steering actuator for a motor vehicle in accordance with at least one of the above embodiments, with the actuator element being moved in a first step into a position defined by the zero point information of the linear sensor for the positioning in a neutral position—for example, in a position for a traveling of the vehicle straight ahead. Subsequently, the actuator element is moved in a second step until the angular position of the rotor detected by the rotary sensor lies in the sector identified by the sector information. This step-wise procedure is of advantage in particular when the linear sensor has a poorer position resolution capability than the rotary sensor—which results in the latter from its angular resolution capability and from the amount of the translation movement of the actuator element which is generated by a revolution of the rotor—. The linear sensor indicates the absolute position of the actuator element which cannot be determined by a simple rotary sensor since it can only indicate the angular position of the rotor. In the second step, the rotor is turned so far, starting from the position reached in the first step, until its angular position comes to lie in the sector identified by the sector information. The extent to which the neutral position reachable by this process deviates from the exactly determined geometrical center position thus depends inter alia on the number of sectors. With a suitable coordination of the tolerances of the linear sensor, of the translation amount of the actuator element per revolution of the rotor and of the resolution capability of the rotary sensor, it is accordingly possible to travel to a neutral position which deviates from the geometrical center position as a maximum by the angular range of a sector or by the movement of the actuator element generated on a corresponding rotation of the rotor.

A preferred embodiment of the method for the operation of a rear axle steering actuator provides that the actuator element is moved in the second step until the bisectrix of the identified sector is reached, whereby the maximum deviation of the neutral position from the geometrical center position amounts to a maximum of half the angular range covered by the sector.

DRAWINGS

The invention will be described in the following purely by way of example with reference to advantageous embodiments and to the drawings. There are shown:

DETAILED DESCRIPTION

Figure 1:
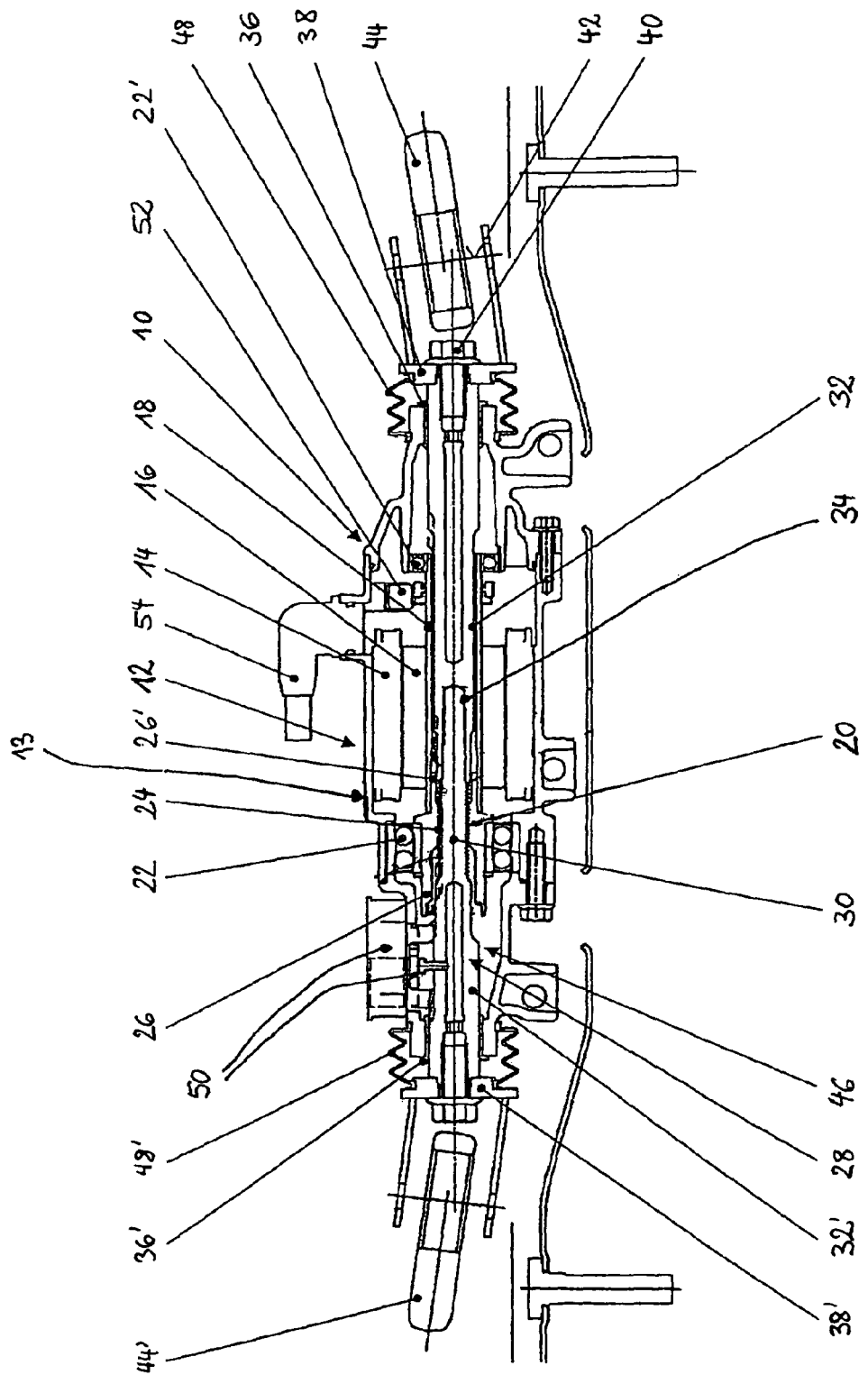
FIG. 1 is a longitudinal section through a rear axle steering actuator.

FIG. 1 shows a rear axle steering actuator 10 which has an electric motor 12. A stator 14 of the electric motor 12 is fastened to the inner side of a housing 13 of the rear axle steering actuator 10—in the following also briefly called the actuator 10—composed of a plurality of individual parts. A rotor 16 of the electric motor 12 associated with the stator 14 is seated on and rotationally fixed to a tubular shaft 18. The tubular shaft 18 merges directly at one side into a spindle nut 20 which is firmly connected to it. Alternatively, the shaft 18 and the spindle nut 20 can be made in one piece.

The tubular shaft 18 with the spindle nut 20 is journaled on the side of the spindle nut 20 in a first bearing 22 and on the side remote from the spindle nut 20 in a second bearing 22' in the housing 13 of the actuator 10. The bearing 22 has particularly thick dimensions, is here made as a double ball bearing, for the taking up of substantial journaling forces. The spindle nut 20 has an internal thread 24 of small diameter and small pitch over a part of its axial extent. Adjoining the thread 24, the spindle nut 20 has collars 26, 26' of larger diameter than the diameter of the thread 24 in both axial directions. A spindle, which is marked overall by the reference numeral 28, comprises a threaded spindle 30 of smaller diameter whose external thread cooperates with the internal thread 24 of the spindle nut 20, and a spindle part 32 of larger diameter adjoining it directly at the right in FIG. 1. In other words, the section of the spindle 28 having the thread has a smaller diameter—in particular a smaller outer diameter—than the sections of the spindle 28 adjoining the threaded section. The spindle part 32 has a center longitudinal bore 34 at the side facing the threaded spindle 30 into which the threaded spindle 30 is inserted and is firmly screwed. The spindle part 32 is supported at its right hand part in FIG. 1 in a sliding bearing 36 with a security against rotation and ends in a connector piece 38 which is firmly connected to it by means of a bolt 40. A steering link 44 leading to a wheel and connected by a pivot axle 42 engages at the connector piece 38.

A spindle part 32' of larger diameter likewise directly adjoins the side of the threaded spindle 30 at the left in FIG. 1. The spindle part 32' is made in one piece with the threaded spindle 30 in the embodiment shown. A shoulder 46 is arranged at the transition between the spindle part of larger diameter 32' and the threaded spindle 30. The end of the spindle part 32 remote from the spindle nut 20 is—analogous to the embodiment of the right hand section of FIG. 1—supported in a sliding bearing 36' with a security against rotation and has a connector piece 38' for the connection of a left hand steering link 44'.

A respective bellows 48, 48' is provided between the housing 13 and the connector pieces 44, 44' to keep dirt away from the sliding bearings 36, 36'. A linear path sensor 50 fastened to the housing 13 is provided at the left hand spindle part of larger diameter 32' and a rotary sensor 52 is provided at the side of the tubular shaft 18 remote from the spindle nut 20. The two sensors 50, 52 form signals for the control, not shown, of the actuator 10. A current supply 54 for the operation of the actuator 10 is only shown by indication.

To enable an actuating position of the rear axle steering actuator 10, the rotor 16 of the electric motor 12 is set into rotation. The rotor 16 drives the spindle nut 20 via the tubular shaft 18. This rotary movement is converted into a translation of the spindle 28 via the thread 24 and the threaded section of the spindle 28, said translation resulting in a corresponding excursion of the steering links 44, 44'.

So that the vehicle dynamics can be advantageously influenced by the rear axle steering, it is of essential importance that the position of the spindle 28 relative to the housing 13 of the actuator 10 fixedly installed in the vehicle is always accurately known. This requires a calibration of the sensors 50, 52 which, on the one hand, themselves have tolerances; but which, on the other hand, cannot be completely perfectly positioned upon their installation in the actuator 10 so that their internal zero point does not necessarily have to coincide with the geometrical center position of the spindle 28 relative to the housing 13. In addition to the calibration information of the path sensor 50, a piece of calibration information relating to the rotary sensor 52 is also detected and stored since the zero point information of the path sensor 50 does not necessarily have to correspond to the absolute zero position of the rotary sensor 52. The calibration information of the total system is composed of the two named pieces of information.

A further important aspect relates to the requirement of the replaceability of the actuator 10. The demand is made on car makers that any desired control unit has to be able to move to a defined position of the actuator 10 after the activation of the rear axle steering actuator 10. Thus, the calibration values of the installed actuator 10 should not be stored in an external driving dynamics control device since this would require a further memory section in the control device and additional worksteps in the installation or on a replacement of the actuator 10.

A general solution for this problem comprises the fact that the path sensor 50 is calibrated to a zero point position which corresponds to the geometrical center position of the spindle 28 between two abutments which bound the maximum excursion of the spindle 28 symmetrically in both directions, for example so that the wheels of the vehicle do not knock in the wheel housing. A corresponding piece of zero point information is stored in the path sensor 50. For this purpose, corresponding memory space is available as standard to the path sensor.

However, there is a further problem in that the described zero point determination is not sufficiently precise since the resolution of the path sensor 50 is not sufficiently high. Generally, the accuracy can be improved in that the angular position of the rotor 16 which is detected by the rotary sensor 52 is taken into account in the calibration. This is possible when the rotary sensor 52 can detect a difference of angular positions of the rotor 16 which corresponds to a translation movement of the spindle 28 which is smaller than the resolution capability of the path sensor 50. The measured value of the rotary sensor 52 is registered for the calibration when the spindle 28 is located in the geometrical center position which was determined, for example, by an external positioning system. The registered measured value is taken into account on the generation of the calibration information of the actuator 10. In particular optical measurement processes by means of lasers are suitable for the determination of the geometrical center position, which can, for example, take place ex works at the manufacturer's of the actuator.

The information of the rotary sensor 52 required for the generation of the calibration information is, however, not stored in the rotary sensor 52, but rather in the linear path sensor 50. A memory section for the storing of the named information in the rotary sensor 52 can thereby be omitted. The common storage of the calibration information of the path sensor 50 and of the rotary sensor 52 moreover simplifies the communication of the actuator 10 with an external control device.

Figure 2:
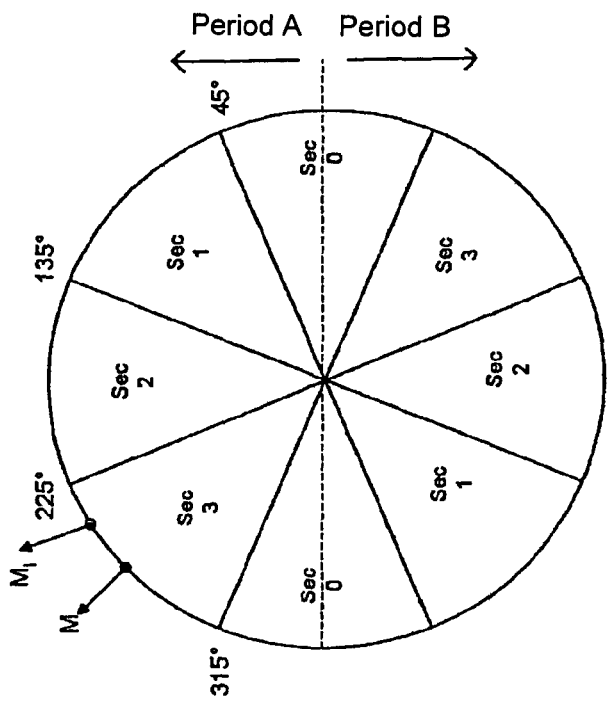
FIG. 2 is a diagram for the explanation of the division of the measurement range of the rotary sensor into sectors.

To keep the memory requirements of the information of the rotary sensor 52 obtained by the calibration low, the measurement range of the rotary sensor is divided into a plurality of sectors, as is shown in FIG. 2.

FIG. 2 shows a diagram of the sector division of a rotary sensor 52 which is based on the principle of a sine-cosine sensor. With such a sensor, a mechanical revolution of 360° of the component to be observed—here the rotor 16—corresponds to two sensor periods of a total of 720°, i.e. 1° of mechanical rotation corresponds to 2° of the electric signal. A suitable rotary sensor 52, for example, has a resolution of +/−3.6° mechanically (+/−7.2° electrically), which corresponds to a resolution of +/−20 μm for a thread stroke of the thread 24 of approximately 2 mm. This resolution is much higher than the resolution of a conventional linear path sensor 50 which usually amounts to +/−175 μm in the region around the sensor center.

Since the exploitation of the generally possible resolution capability of the rotary sensor 52 is not necessary for a sufficiently good calibration and since the memory depth required for the storage of the calibration value should be minimized, the measurement range of the rotary sensor 52 is divided into a plurality of sectors which are associated with specific angular ranges of a mechanical revolution of the rotor 16. Expediently, these sectors are of equal size. This division of the measurement range substantially represents a reduction of the resolution capability of the rotary sensor 52 which accompanies a reduction of the memory requirement for the storage of the calibration value. The optimum between the required calibration precision and the available memory depth can be achieved by a suitable choice of the angular ranges or of the number of sectors.

FIG. 2 shows such a division of the measurement range of the rotary sensor 52. As already described above, a mechanical revolution of the rotor 16 corresponds to two sensor periods A, B. FIG. 2 shows a division of a mechanical revolution, whereas the angular indications of the sectors in the table shown above the diagram relate to two sensor periods with a total of 720°. A decision can be made on the basis of the sufficiently high resolution capability of the path sensor 50 in which of the sensor periods A, B the angular position of the rotor 16 lies. A mechanical revolution is therefore effectively divided into four sectors which are designated by Sec 0 to Sec 3.

For the calibration of the position determination system of the actuator 10 which includes the linear path sensor 50 and the rotary sensor 52, it is thus not the value $M_i$ of the exact angular position of the rotor 16 which is stored when the spindle 28 is located in the previously determined geometrical center position. It is rather the case that only a piece of information is stored with respect to that sector in which the angular position $M_i$ of the rotor 16 corresponding to the exact center position comes to lie. This is the sector 3 in the case shown.

Since a mechanical revolution of the rotor 16 was divided into four sectors in the example shown, the sector information can be encoded by two bits so that the information of the rotary sensor 52 to be stored has only a low memory requirement. The present embodiment has as a special feature that the sector information is, however, not stored in a specific area of the memory section of the path sensor 50, but is rather encoded by a selection of the output signal frequency of the path sensor 50. The table already mentioned above shows the association of the individual sectors to specific frequencies of the output signal. In the case shown, the rotor 16 lies in the geometrical center position of the spindle 28 in the angular position $M_i$ which falls in the sector Sec 3. The path sensor 50 is therefore configured within the course of the calibration so that its output signals are transmitted at 2000 Hz. This information can be detected and utilized simply by an external control device.

In the following, the course of the calibration method will be explained in more detail with reference to FIG. 3.

The control of the calibration process is carried out by an external calibration unit. This includes, for example, a laser sensor which is used for the determination of reference positions. The procedure during the calibration process is shown in FIG. 3.

Figure 3:
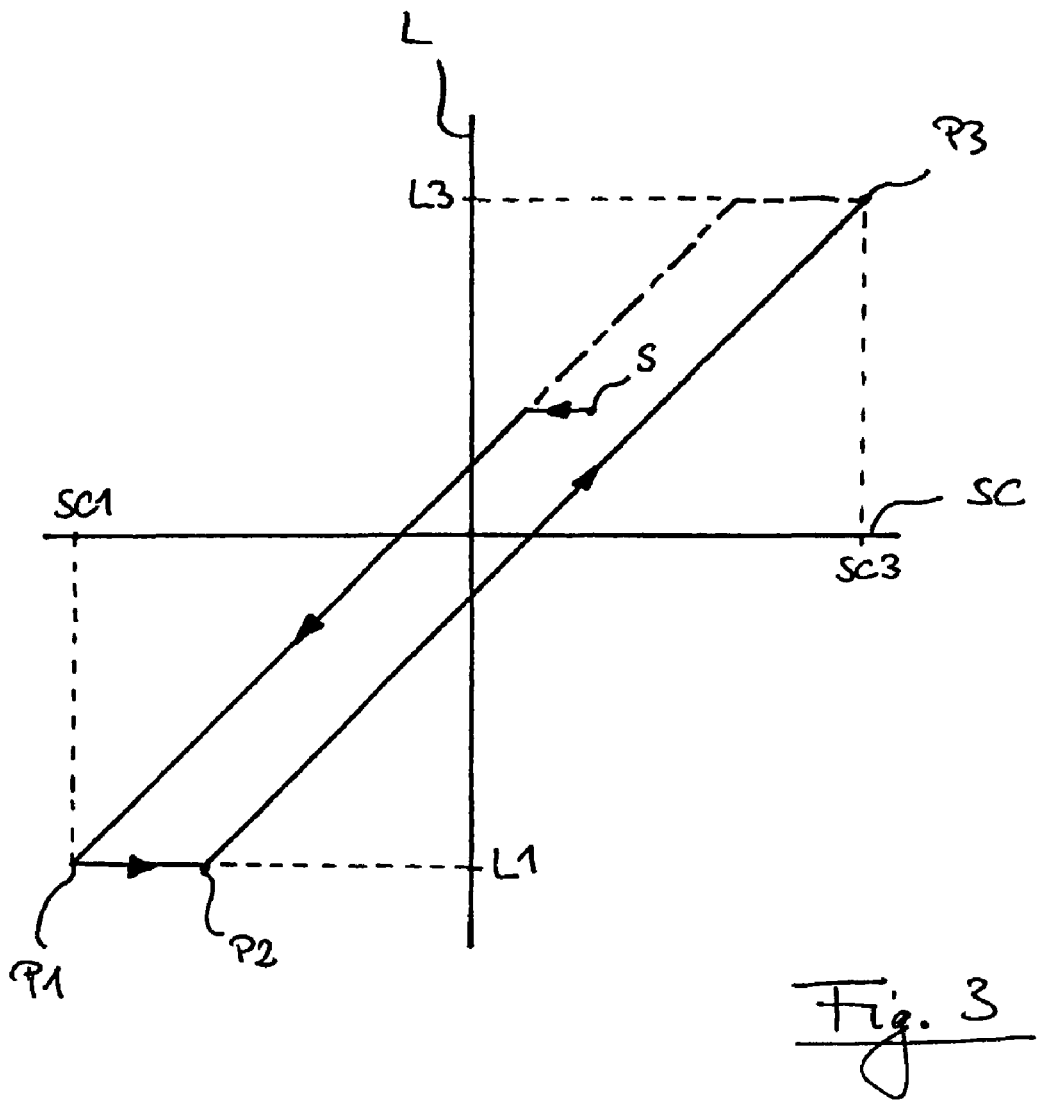
FIG. 3 is a diagram for the illustration of the calibration process.

FIG. 3 shows the position of the spindle 28 as is represented in the data space of a laser sensor for the absolute determination of the spindle position—designated by L—and of an SC rotary sensor (sine-cosine rotary sensor—designated by SC. Starting from a start point S, which can correspond to any desired position of the spindle 28, the spindle 28 is moved by rotation of the rotor 16 up to the reaching of a first abutment position P1. Subsequently, the direction of rotation of the rotor 16 is reversed, with initially a translation movement of the spindle 28 not yet being recorded. Only from point P2 does the spindle 28 start to move in the other direction. The path from the first abutment position P1 to the point P2 only detected by the rotary sensor 52 is designated as a hysteresis which is shown clearly overdrawn in FIG. 1.

The spindle 28 is moved so long until a second abutment position P3 has been reached. At the points P1 and P3, the measured values L1 and L3 respectively of the laser sensor and the angle data of the rotary sensor—SC1 and SC3—are detected.

The geometrical center position of the spindle 28 can be precisely determined from the measured values L1 and L3. The sector can already be determined from the values for the angular position of the rotor 16 in the abutments P1, P3 (SC1 and SC3 respectively) in which the angular position $M_i$ of the rotor 16 corresponding to the geometrical center position lies if, in addition, it is known how many revolutions the rotor 16 has made during the movement of the spindle 28 from the first abutment position P1 to the second abutment position P3.

It is naturally also possible to determine the sector in which the angular position $M_i$ lies in that the spindle 28 is moved into the geometrical center position determined by the laser sensor and the value of the rotary sensor 52 is read there as can also be practiced in an analog manner for the calibration of the linear path sensor 50.

During the operation of a vehicle, it is frequently necessary that the rear axle steering actuator 10 adopts a neutral position so that, for example, an exact driving straight ahead is possible. To move to the neutral position, the spindle 28 is moved so long until the position determined by the path sensor 50 coincides with the stored zero point information of the linear path sensor 50. The spindle 28 is thus already in the correct half-turn of the rotary sensor 52 so that the ambiguity (see FIG. 2) existing due to the presence of the two sensor periods A, B can be resolved. The spindle 28 is now moved further for so long until the rotary sensor 52 outputs a measured value which lies in the sector defined by the output signal frequency of the path sensor 50. It can be seen directly from FIG. 2 that the maximum angle deviation between the angular position $M_i$ of the rotor 16 corresponding to the geometrical center position and the angular position of the rotor 16 amounts to 45° in the neutral position moved to.

To reduce this maximum deviation, on a movement to the neutral position of the spindle 28, a stop is not made on the reaching of the correct sector, but rather the rotor 16 driving the spindle 28 is rotated so far until the rotary sensor 52 outputs a value which corresponds to a bisectrix M of the corresponding sector. The maximum angular position deviation of the rotor 16 from the angular position $M_i$ corresponding to the geometrical center position of the spindle 28 thus halves and now amounts to a maximum of 22.5°. The bisectrix M associated with the individual sectors Sec 0 to Sec 3 can be seen from the last column of the table in FIG. 2.

The neutral position of the spindle 28 can already be moved to more precisely by a division of a revolution of the rotor 16 into four measurement range sectors of the rotary sensor 52 than while using only a linear path sensor 50 of the kind described above. The information required for this purpose does not require any further memory space. An increase in the number of sectors leads to a further precision of the described procedure.

It was described above with reference to FIG. 3 that the first and second abutment positions P1, P3 are of fundamental importance for the carrying out of the reference measurement. However, stiffness situations frequently occur which can simulate the achieving of the abutment. To prevent artifacts thereby arising, the spindle 28 is moved so long in a direction until its measured speed falls below a threshold value. After falling below this minimal value, it is assumed that the abutment has actually been reached. The spindle 28 is then moved in the opposite direction by a specific amount and the abutment is "searched" again. This procedure is repeated for so long until the respectively determined abutment positions of three passes—within a predetermined tolerance range—deliver coinciding results. Alternatively or additionally, an averaging of the results can be carried out and/or two or more than three passes to find the abutment can be carried out.

To improve the position determination, a reference curve characterizing the path sensor 50 can be prepared by means of sampling points whose position is precisely known by the laser measurements described above. For this purpose, the position data determined at the sampling points by the linear path sensor 50 are compared with the known position data. Correction parameters can be determined by the comparison which can be used for the calibration of the path sensor 50.

The sampling points can in particular be spaced closer to one another in the region around the geometrical center position than, for example, in the proximity of the abutment position P1, P3 to make the correction particularly precise here.

The described concepts are generally not restricted to the use with respect to rear axle steering systems. Their use can also be considered in connection with other actuators and systems—in particular in the area of a driving dynamics regulation of motor vehicles—in which the addressed problem is relevant, such as wobble stabilizers or systems to influence the wheel suspension geometry.

REFERENCE NUMERAL LIST 10 rear axle steering actuator
12 electric motor
13 housing
14 stator
16 rotor
18 shaft
20 spindle nut
22, 22' bearing
24 thread
26, 26' collar
28 spindle
30 threaded spindle
32, 32' spindle part
34 longitudinal bore
36, 36' sliding bearing
38, 38' connector piece
40 bolt
42 pivot axis
44, 44' steering link
46 shoulder
48, 48' folding bellows
50 linear path sensor
52 rotary sensor
54 current supply
A, B sensor period
$M_i$ angular position of the rotor in the geometrical center position of the spindle
M bisectrix
S starting point
L, SC sensor data
P1, P3 abutment position
P2 point
Sec 0-Sec 3 sector

The invention claimed is:

1. A method for the calibration of a position determination system of a rear axle steering actuator for a motor vehicle which has an actuator element which can be driven by a rotary movement of a rotor to a translation movement and whose geometrical center position is determined by a reference measurement, the method including:
providing the position determination system with a linear sensor and a rotary sensor;
generating a piece of calibration information during the calibration which includes a piece of zero point information of the linear sensor and a piece of sector information of the rotary sensor;
wherein the measurement range of the rotary sensor is divided into at least two sectors and the sector information identifies that sector in which the angular position ($M_i$) of the rotor detected by the rotary sensor lies when the actuator element is arranged in its geometrical center position; and
storing both the piece of zero point information and the piece of sector information which define the calibration information in the linear sensor.

2. The method in accordance with claim 1, wherein the respective angular region covered by the sectors is larger than the angular resolution of the rotary sensor.

3. The method in accordance with claim 1, wherein the linear sensor includes a non-volatile memory section in which at least a part of the calibration information is stored.

4. The method in accordance with claim 1, wherein a respective predetermined frequency of an output signal of the linear sensor is associated with each of the sectors, and wherein the sector information is stored in the linear sensor by a selection of the corresponding frequency.

5. The method in accordance with claim 1, wherein the reference measurement respectively includes at least one measurement in at least two defined reference positions, with each measurement including at least one measured value determination of at least one of the linear sensor and the rotary sensor.

6. The method in accordance with claim 1, wherein the reference measurement includes measurements by a position sensor which is associated with an optical measuring process.

7. The method in accordance with claim 6, wherein a plurality of measurements of the linear sensor are carried out for the position determination in different measurement positions of the actuator element, with the location of the measurement positions relative to the geometrical center position being known by measurements of the position sensor, and with at least one correction parameter or at least one correction function being determined on the basis of the deviations of the position determinations of the linear sensor from the measurement positions of the actuator element, which are taken into the zero point information of the linear sensor.

8. The method in accordance with claim 1, wherein the actuator element is moved into the geometrical center position; and wherein the zero point information of the linear sensor and the sector information are determined there.

9. The method in accordance with claim 1, wherein the geometrical center position is determined by the formation of a geometrical average of measurements in two maximum excursions (P1, P3) of the actuator element.

10. The method in accordance with claim 9, wherein the maximum excursions (P1, P3) of the actuator element are defined by a respective mechanical abutment.

11. The method in accordance with claim 9, wherein the position of the actuator element in the respective maximum excursion (P1, P3) is checked by at least one repeat position determination or is determined by averaging of at least two position determinations.

12. The method in accordance with claim 9, wherein the reaching of the respective maximum excursion (P1, P3) is defined by falling below a predetermined threshold value of the speed of the actuator element.

13. The method in accordance with claim 9, wherein the sector information is determined with reference to measured values of the rotary sensor determined in the maximum excursions (P1, P3) and to the number of revolutions of the rotor determined by the rotary sensor during the movement of the actuator element between the maximum excursions (P1, P3).

14. A position determination system of a rear axle steering actuator for a motor vehicle, wherein the rear axle steering actuator has an actuator element which can be driven by a rotary movement of a rotor to a translation movement, wherein the position determination system includes a rotary sensor and a linear sensor which are connected to the rear axle steering actuator, wherein a geometrical center position of the actuator element between two maximum excursions (P1, P3) is determined by a calibration unit, wherein the measurement range of the rotary sensor is divided into at least two sectors, wherein a piece of calibration information is generated which includes a piece of zero point information of the linear sensor and a piece of sector information of the rotary sensor, wherein the sector information identifies that sector in which the angular position ($M_t$) of the rotor determined by the rotary sensor lies when the actuator element is arranged in the geometrical center position, and wherein the piece of zero point information and the piece of sector information which define the calibration information are both stored in the linear sensor.

15. The position determination system in accordance with claim 14, wherein the respective angular range covered by the sectors is divided so that it is larger than the angular resolution of the rotary sensor.

16. The position determination system in accordance with claim 14, wherein the linear sensor includes a non-volatile memory section in which at least one part of the calibration information is stored.

17. The position determination system in accordance with claim 14, wherein the linear sensor is configured such that the sector information is encoded by a frequency of an output signal of the linear sensor associated with each of the sectors.

18. The position determination system in accordance with claim 14, wherein the calibration unit includes a position sensor which is based on an optical measurement process, with the position of the actuator element being is determined relative to a reference point by the position sensor.

19. The position determination system in accordance with claim 18, wherein the calibration unit is made such that at least one correction factor and/or at least one correction function is determined by a comparison of measurements of the linear sensor and of the position sensor in different positions of the actuator element which are taken into the zero point information of the linear sensor.

20. A method for the operation of a rear axle steering actuator for a motor vehicle having a position determination system in accordance with claim 14, wherein the actuator element is moved into a position defined by the zero point information of the linear sensor in a first step; and
wherein the actuator element is moved in a second step until the angular position of the rotor detected by the rotary sensor lies in the sector identified by the sector information.

21. The method in accordance with claim 20 wherein the actuator element is moved in the second step until the angular position of the rotor corresponds to a bisectrix (M) of the identified sector.

22. A method for calibrating a position determination system associated with a driving dynamics system of a motor vehicle having an actuator element that is translated in response to rotary movement of a rotor, the method comprising the steps of:
providing a linear path sensor for detecting the translational position of the actuator element and a rotary sensor for detecting the angular position of the rotor;
determining a geometrical center position of the actuator element;
generating a piece of calibration information including a piece of zero point information of the linear sensor and a piece of sector information of the rotary sensor, wherein the measurement range of the rotary sensor is divided into at least two sectors with the sector information identifying the specific sector in which the angular position ($M_1$) of the rotor lies when the actuator element is located in its geometrical center position; and
storing both the piece of zero point information and the piece of sector information which define the calibration information in the linear sensor.

23. The method in accordance with claim 22, wherein the respective angular region covered by the sectors is larger than the angular resolution of the rotary sensor.

24. The method in accordance with claim 22, wherein the linear sensor includes a non-volatile memory section in which at least a part of the calibration information is stored.

25. The method in accordance with claim 22, wherein a respective predetermined frequency of an output signal of the linear sensor is associated with each of the sectors, and wherein the sector information is stored in the linear sensor by a selection of the corresponding frequency.

26. The method in accordance with claim 22, wherein the geometrical center position of the actuator element is determined by a reference measurement, and wherein the reference measurement respectively includes at least one measurement in at least two defined reference positions, with each measurement including at least one measured value determination of at least one of the linear sensor and the rotary sensor.

27. The method in accordance with claim 22, wherein the geometrical center position of the actuator element is determined by a reference measurement, and wherein the reference measurement includes measurements by a position sensor associated with an optical measuring process.

28. The method in accordance with claim 27, wherein a plurality of measurements of the linear sensor are carried out for the position determination in different measurement positions of the actuator element, with the location of the measurement positions relative to the geometrical center position being known by measurements of the position sensor, and with at least one correction parameter or at least one correction function being determined on the basis of the deviations of the position determinations of the linear sensor from the measurement positions of the actuator element.

29. The method in accordance with claim 22, wherein the actuator element is moved into the geometrical center position, and wherein the zero point information of the linear sensor and the sector information are determined with the actuator element in the geometrical center position.

30. The method in accordance with claim 22, wherein the geometrical center position is determined by the formation of a geometrical average of measurements in two maximum excursions of the actuator element.

31. The method in accordance with claim 30, wherein the two maximum excursions of the actuator element are defined by a pair of mechanical abutments.

32. The method in accordance with claim 30, wherein the position of the actuator element in at least one of the maximum excursions is checked by at least one repeat position determination and/or is determined by averaging of at least two position determinations.

33. The method in accordance with claim 30, wherein the reaching of the respective maximum excursions is defined by falling below a predetermined threshold value of the speed of the actuator element.

34. The method in accordance with claim 30, wherein the sector information is determined with reference to measured values of the rotary sensor determined in the maximum excursions and to the number of revolutions of the rotor determined by the rotary sensor during the movement of the actuator element between the maximum excursions.

35. A method for calibrating a position determination system associated with a driving dynamics system of a motor vehicle having an actuator element which can be translated in response to rotary movement of a rotor and whose geometrical center position is determined by a reference measurement, the method including:

provide the position determination system with a linear sensor and a rotary sensor;

generating a piece of calibration information during the calibration which includes a piece of zero point information of the linear sensor and a piece of sector information of the rotary sensor, wherein the measurement range of the rotary sensor is divided into at least two sectors and the sector information identifies that sector in which the angular position of the rotor detected by the rotary sensor lies when the actuator element is arranged in its geometrical center position; and storing the calibration information in the linear sensor, wherein a predetermined characteristic of an output signal of the linear sensor is associated with each of the sectors, and wherein the sector information is stored in the linear sensor by a selection of the corresponding characteristic of the output signal.

36. The method in accordance with claim 35 wherein the driving dynamics system is a rear axle steering system including an axle steering actuator having the actuator element.

37. A method for calibrating a position determination system associate with a driving dynamics system of a motor vehicle having an actuator element which can be translated in response to rotary movement of a rotor and whose geometrical center position is determined by a reference measurement, the method including:

providing the position determination system with a linear sensor and a rotary sensor;

generating a piece of calibration information during the calibration which includes a piece of zero point information of the linear sensor and a piece of sector information, wherein the measurement range of the rotary sensor is divided into at least two sectors and the sector information identifies that sector in which the angular position of the rotor detected by the rotary sensor lies when the actuator element is arranged in its geometrical center position, and wherein the geometrical center position is determined by the formation of a geometrical average of measurements in two maximum excursions of the actuator element; and storing the calibration information in the linear sensor.

38. The method in accordance with claim 37 wherein the driving dynamics system is a rear axle steering system including an axle steering actuator having the actuator element.

39. A position determination system of an axle steering actuator for a motor vehicle, wherein the axle steering actuator has an actuator element which can be driven by a rotary movement of a rotor to a translation movement, wherein the position determination system includes a rotary sensor and a linear sensor, wherein a geometrical center position of the actuator element between two maximum excursions is determined by a calibration unit, wherein the measurement range of the rotary sensor is divided into at least two sectors, wherein a piece of calibration information is generated which includes a piece of zero point information of the linear sensor and a piece of sector information of the rotary sensor, wherein the sector information identifies that sector in which the angular position of the rotor determined by the rotary sensor lies when the actuator element is arranged in its geometrical center position, wherein the linear sensor is configured such that the sector information is encoded by a characteristic of an output signal of the linear sensor associated with each of the sectors, and wherein the calibration information is stored in the linear sensor.

40. A method for calibrating a position determination system associated with a driving dynamics system of a motor vehicle having an actuator element that is translated in response to rotary movement of a rotor, the method comprising the steps of:

providing a linear path sensor for detecting the translational position of the actuator element and a rotary sensor for detecting the angular position of the rotor;

determining a geometrical center position of the actuator element;

generating a piece of calibration information including a piece of zero point information of the linear sensor and a piece of sector information, wherein the measurement range of the rotary sensor is divided into at least two sectors with the sector information identifying the specific sector in which the angular position of the rotor lies when the actuator element is located in its geometrical center position; and storing the calibration information in the linear sensor, wherein a predetermined characteristic of an output signal of the linear sensor is associated with each of the sectors, and wherein the sector information is stored in the linear sensor by a selection of the corresponding characteristic of the output signal.

41. A method for calibrating a position determination system associated with a driving dynamics system of a motor vehicle having an actuator element that is translated in response to rotary movement of a rotor, the method comprising the steps of:

providing a linear path sensor for detecting the translational position of the actuator element and a rotary sensor for detecting the angular position of the rotor;

determining a geometrical center position of the actuator element;

generating a piece of calibration information including a piece of zero point information of the linear sensor and a piece of sector information, wherein the measurement range of the rotary sensor is divided into at least two sectors with the sector information identifying the specific sector in which the angular position of the rotor lies when the actuator element is located in its geometrical center position; and wherein the geometrical center position is determined by the formation of a geometrical average of measurements in two maximum excursions of the actuator element, and storing the calibration information in the linear sensor.

* * * * *